United States Patent
Soulages et al.

(10) Patent No.: US 9,309,337 B2
(45) Date of Patent: Apr. 12, 2016

(54) BRANCHED SATURATED HYDROCARBON POLYMERS AS EXTENSIONAL RHEOLOGY MODIFIERS WITHOUT IMPACTING SHEAR PROPERTIES

(71) Applicants: Johannes Matthieu Soulages, Morristown, NJ (US); David John Lohse, Bridgewater, NJ (US); Andy Haishung Tsou, Allentown, PA (US); Thomas Sun, Clinton, NJ (US); Pamela Jean Wright, Easton, PA (US); Nikos Hadjichristidis, Athens (GR); Pradeep Pandurang Shirodkar, Houston, TX (US)

(72) Inventors: Johannes Matthieu Soulages, Morristown, NJ (US); David John Lohse, Bridgewater, NJ (US); Andy Haishung Tsou, Allentown, PA (US); Thomas Sun, Clinton, NJ (US); Pamela Jean Wright, Easton, PA (US); Nikos Hadjichristidis, Athens (GR); Pradeep Pandurang Shirodkar, Houston, TX (US)

(73) Assignee: EXXONMOBIL RESEARCH AND ENGINEERING COMPANY, Annandale, NJ (US)

(*) Notice: Subject to any disclaimer, the term of this patent is extended or adjusted under 35 U.S.C. 154(b) by 285 days.

(21) Appl. No.: 13/855,181

(22) Filed: Apr. 2, 2013

(65) Prior Publication Data
US 2013/0261264 A1    Oct. 3, 2013

Related U.S. Application Data

(60) Provisional application No. 61/619,070, filed on Apr. 2, 2012.

(51) Int. Cl.
*C08F 110/02* (2006.01)
*C08L 23/06* (2006.01)

(52) U.S. Cl.
CPC .............. *C08F 110/02* (2013.01); *C08L 23/06* (2013.01)

(58) Field of Classification Search
None
See application file for complete search history.

(56) References Cited

U.S. PATENT DOCUMENTS

| | | | |
|---|---|---|---|
| 5,026,798 | A | 6/1991 | Canich |
| 5,206,303 | A | 4/1993 | Tse et al. |
| 5,272,236 | A | 12/1993 | Lai et al. |
| 5,278,272 | A | 1/1994 | Lai et al. |
| 5,294,678 | A | 3/1994 | Tse et al. |
| 5,324,800 | A | 6/1994 | Welborn, Jr. et al. |
| 5,475,075 | A | 12/1995 | Brant et al. |
| 6,355,757 | B2 | 3/2002 | Garcia-Franco et al. |
| 6,391,998 | B1 | 5/2002 | Garcia-Franco et al. |
| 6,417,281 | B1 | 7/2002 | Garcia-Franco et al. |
| 6,578,413 | B2 | 6/2003 | Sentmanat |
| 6,691,569 | B1 | 2/2004 | Sentmanat |
| 7,687,580 | B2 | 3/2010 | Lohse et al. |
| 8,168,724 | B2 | 5/2012 | Lohse et al. |
| 2009/0163666 | A1 | 6/2009 | Lohse et al. |
| 2011/0136982 | A1* | 6/2011 | Tse et al. ........................ 525/240 |
| 2013/0209774 | A1* | 8/2013 | Shirodkar et al. ............. 428/220 |

FOREIGN PATENT DOCUMENTS

| | | |
|---|---|---|
| EP | 0659773 B1 | 8/1998 |
| WO | 9707930 A1 | 4/1994 |

OTHER PUBLICATIONS

Ajji et al., "Elongational rheology of LLDPE/LDPE blends", Journal of Applied Polymer Science, (2003), 88(14); Industrial Materials Institute, National Research Council of Canada, Boucherville, QC, J4B 6Y4, Can. 3070-3077; ISSN: 0021-8995, (2003).

Chai, "The effect of molecular structure on the extensional melt rheology of conventional and metallocene polyethylenes", Research and Technology Centre, BP Amoco Chemicals, Lavera, 13117, Fr. Annual Technical Conference—Society of Plastics Engineers (2000), h(vol. 1), 1096-1100; ISSN: 0272-5223.

Munstedt, "Rheological Properties and Molecular Structure of Polymer Melts", Institute of Polymer Materials, University Erlangen-Nuernberg, Erlangen, D-91058, Germany; Soft Matter (2011), 7(6), 2273-2283; ISSN: 1744-683X.

Wadud et al.,"Rheology of Metallocene•Catalyzed Polyethylenes—The Effects of Branching", Annual Technical Conference—Society of Plastics; Engineers, (1999), 57th (vol. 1), 1200•1204; Department of Chemical Engineering, Virginia Polytechnic Institute and State University, Blacksburg, VA, 24061-0211, USA; ISSN: 0272-5223.

Bin Wadud et al., "Shear and Extensional Rheology of Sparsely Branched Metallocene•Catalyzed Polyethylenes", Journal of Rheology (New York), (2000), 44(5), 1151-1167; Department of Chemical Engineering, Virginia Polytechnic Institute and State University, Blacksburg, VA, 24061, USA; ISSN: 0148-6055.

Wagner et al., "Quantitative Analysis of Melt Elongational Behavior of LLDPE/LDPE Blends", Rheologica Acta, (2004), 44(2), 198-218; Polymertechnik/Polymerphysik, TU Berlin, Berlin, D-10623, Germany; ISSN: 0035-4511.

Stadler et al., "Influence of Molar Mass Distribution and Long•Chain Branching on Strain Hardening of Low Density Polyethylene", Rheologica Acta, (2009), 48(5), 479-490; Institute of Polymer Materials, Friedrich-Alexander-University Erlangen-Nuernberg, Erlangen, D-91058, Germany; ISSN: 0035-4511.

(Continued)

*Primary Examiner* — Jeffrey Mullis
(74) *Attorney, Agent, or Firm* — Robert A. Migliorini (57) ABSTRACT

Provided are blends of branched hydrocarbon comb polymers having tailored branching and molecular weight parameters, with substantially linear polymers. Such blends have been found to have improved extensional rheological properties, while maintaining nearly the viscosity of the substantially linear polymers. The blends of the hydrocarbon comb polymers with the substantially linear polymers thus maintain the extrusion processing characteristics of the linear polymer alone, but have improved extensional flow processability, with strain hardening ratios (SHR) greater than 1. The blends are effective in blown film processing. Also disclosed are related methods for improving extensional flow processability using the branched hydrocarbon comb polymers, as well as the branched hydrocarbon comb polymers themselves, including as a property enhancing additive for such substantially linear polymers.

16 Claims, 7 Drawing Sheets

(56) References Cited

OTHER PUBLICATIONS

Okamoto et al., "Shear Modification and Elongational Behavior of Two Types of Low•Density Polyethylene Melts with Different Long Chain Branching", AIP Conference Proceedings, (2008), 1027(Pt. 1, 15th International Congress on Rheology, 2008), 454-456,; Japan Advanced Institute of Science and Technology, School of Materials Science, Asahidai 1-1, Nomi, Ishikawa, 923-1292, Japan; ISSN: 0094-243X.

Gabriel et al., "Strain Hardening of Various Polyolefins in Uniaxial Elongational Flow", Journal of Rheology, 47(3), 619-630 (2003).

Sentmanat et al., "Measuring the Transient Extensional Rheology of Polyethylene Melts Using the SER Universal Testing Platform", Journal Rheology, 49(3), 585-606 (2005).

Hadjichristidis et al., "Well-Defined, Model Long Chain Branched Polyethylene: Part 1: Synthesis and Characterization", Macromolecules 2000, 33, 2424.

Lohse et al., "Well-Defined, Model Long Chain Branched Polyethylene: Part 2: Melt Rheological Behavior"; Macromolecules 2002, 35, 3066.

Koutalas et al., "Well-Defined Comb, Star-Comb and Comb-on-Comb Polybutadienes by Anionic Polymerization and the Macromonomer Strategy", Macromolecules 2005, 38, 4996.

Koutalas et al., "Novel Block-Comb/Graft Copolymers by Using the Macromonomer Strategy and Anionic Polymerization ", Journal of Polymer Science—Chemistry 2005, 43, 4040.

Driva et al., "Anionic Homo- and Copolymerization of Double-Tailed Macromonomers. A Route to Novel Macromolecular Architectures", Journal of Polymer Science—Chemistry 2005, 43, 4070.

Orfanou et al., "Synthesis of Well-Defined Second (G-2) and Third (G-3) Generation Dendritic Polybutadienes", Macromolecules 2006, 39, 4361.

Kapnistos et al., "Linear rheology of comb polymers with star-like backbones: Melts and Solutions", Rheologica Acta 2006, 46, 273.

van Ruymbeke et al., "Entangled Dendritic Polymers and Beyond: Linear Rheology of Symmetric Cayley-Tree Polymers and Macromolecular Self-assemblies", Macromolecules 2007, 40, 5941.

Driva et al., "Well-Defined Complex Macromolecular Architectures by Anionic Polymerization of Styrenic Single and Double Homo/Miktoarm Star-Tailed Macromonomers", Journal of Polymer Science—Chemistry 2008, 46, 1826.

Lee et al., "Linear and Nonlinear Rheology of Dendritic Star Polymers: Experiment", Macromolecules 2008, 41, 9165.

Lee et al., "Damping Behavior of Entangled Comb Polymers: Experiment", Macromolecules 2009, 42, 1392.

Nikopoulou et al., "Synthesis of Exact Comb Polybutadienes with Two and Three Branches", Journal of Polymer Science—Chemistry 2009, 47, 2597.

\* cited by examiner

BRANCHED SATURATED HYDROCARBON POLYMERS AS EXTENSIONAL RHEOLOGY MODIFIERS WITHOUT IMPACTING SHEAR PROPERTIES

CROSS-REFERENCE TO RELATED APPLICATIONS

This application claims the benefit of U.S. Provisional Application Ser. No. 61/619,070, filed on Apr. 2, 2012; which is incorporated herein in its entirety by reference.

FIELD

The present disclosure relates to branched hydrocarbon comb polymers which have been found to improve the extensional rheology of substantially linear polymers while not adversely affecting the shear viscosity of the substantially linear polymers. Blends of the hydrocarbon comb polymers with the substantially linear polymers thus maintain the extrusion processing characteristics of the linear polymer alone, but have improved extensional flow processabilities with strain hardening ratio greater than 1, as compared to the substantially linear polymer alone. The blends are suitable for blown film processing.

BACKGROUND

Ethylene copolymers are a well-known class of olefin copolymers from which various plastic products are now produced. Such products include films, fibers, and thermomolded articles such as containers and coatings. The polymers used to prepare these articles are prepared from ethylene, optionally with one or more additional copolymerizable monomers. The first PE grades were made in the 1930's using free radical chemistry at high pressures, and they turned out to be fairly easy to form into various articles. Over the years, it was realized that this was due to the fact that these low density polyethylene (LDPE) resins contained highly branched species. When linear forms of LDPE (LLDPE) became available in the 1960's, it was recognized that films made from them were superior to LDPE films in terms of puncture resistance, impact resistance, tear strengths, and clarity, but they also could not be processed as easily on the existing equipment used for LDPE. The recognition that the form and level of long chain branching (LCB) in LDPE was the reason for both the easy processing and the deterioration in physical properties of the films has led to a long-time effort to tailor the LCB to achieve a better balance of processability (e.g., motor load during extrusion, blown film line speed, bubble stability) and performance (e.g., film mechanical strengths, absence of gels). Low density polyethylene ("LDPE") as produced by free radical polymerization consists of many LCB structures where the LCB branches occur randomly along the polymer backbone and branches. These structures allowed LDPEs to have easy processing, which means that LDPE can be melt processed in high volumes at low energy input in an extruder, a blown film line, a blow molder, and other polymer processing/fabrication equipment. Since LDPE was the first PE introduced, machinery for conducting PE melt processing, for example extruders and film dies of various configurations, was designed based on the processing characteristics of the LDPE.

However, with the advent of effective coordination catalysis of ethylene copolymers, the degree of long chain branching was significantly decreased, both for the now traditional Ziegler-Natta ethylene copolymers and for the newer metallocene-catalyzed ethylene copolymers. Both, particularly the metallocene copolymers, are essentially linear polymers (but these processes can also lead to branched resins by macromonomer reincorporation), which are more difficult to melt process, especially when the molecular weight distribution (MWD=$M_W/M_N$, where $M_W$ is weight-average molecular weight and $M_N$ is number-average molecular weight) is narrower than 3.5. Although broad MWD copolymers are more easily processed but can lack desirable solid state attributes otherwise available from the metallocene copolymers. Thus it has become desirable to develop effective and efficient methods of improving the melt processing of olefin copolymers while retaining desirable melt properties and end-use characteristics.

The introduction of long chain branches into substantially linear olefin copolymers has been observed to improve processing characteristics of the polymers. Such has been done using metallocene polymers where significant numbers of olefinically unsaturated chain ends are produced during the polymerization reaction. See e.g., U.S. Pat. No. 5,324,800. The olefinically unsaturated polymer chains can become "macromonomers" (or "macromers") and, apparently, can be re-inserted with other copolymerizable monomers to form the branched copolymers. International publication WO 94/07930 addresses advantages of including long chain branches in polyethylene from incorporating vinyl-terminated macromers into polyethylene chains where the macromers have critical molecular weights greater than 3,800, or, in other words contain 250 or more carbon atoms. Conditions said to favor the formation of vinyl terminated polymers are high temperatures, no co-monomer, no transfer agents, and a non-solution process or a dispersion using an alkane diluent. Increased temperature during polymerization is also said to yield β-hydride eliminated product, for example, while adding ethylene so as to form an ethylene "end cap". This document goes on to describe a large class of both monocyclopentadienyl and biscyclopentadienyl metallocenes as suitable in accordance with the disclosure when activated by either alumoxanes or ionizing compounds providing stabilizing, non-coordinating anions.

U.S. Pat. Nos. 5,272,236 and 5,278,272, herein incorporated by reference in their entirety, describe "substantially linear" ethylene polymers which are said to have up to 3 long chain branches per 1000 carbon atoms. These polymers are described as being prepared with certain monocyclopentadienyl transition metal olefin polymerization catalysts, such as those described in U.S. Pat. No. 5,026,798. The copolymer is said to be useful for a variety of fabricated articles and as a component in blends with other polymers.

EP-A-0 659 773 describes a gas phase process using metallocene catalysts said to be suitable for producing polyethylene with up to 3 long chain branches per 1000 carbon atoms in the main chain, the branches having greater than 18 carbon atoms.

Reduced melt viscosity polymers are addressed in U.S. Pat. Nos. 5,206,303 and 5,294,678. "Brush" polymer architecture is described where the branched copolymers have side chains that are of molecular weights that inhibit entanglement of the backbone chain. These branch weight-average molecular weights are described to be from 0.02-2.0 $M_e^B$, where $M_e^B$ is the entanglement molecular weight of the side branches. Though the polymers illustrated are isobutylene-styrene copolymers, calculated entanglement molecular weights for ethylene polymers and ethylene-propylene copolymers of 1,250 and 1,660 are provided.

Comb-like polymers of ethylene and longer alpha-olefins, having from 10 to 100 carbon atoms, are described in U.S.

Pat. No. 5,475,075. The polymers are prepared by copolymerizing ethylene and the longer alpha-olefins which form the side branches. Improvements in end-use properties, such as for films and adhesive compositions, are taught.

The effect of the LDPE content on the crystallinity and strain hardening of LDPE/LLDPE blends was investigated in "Elongational rheology of LLDPE/LDPE blends", *Journal of Applied Polymer Science*, (2003), 88(14). Three LLDPEs (octene, hexene and butene co-monomer) and three LDPEs (melt flow index (MFI) 0.3, 0.9 and 2.5) were used. The blends were prepared using a single screw extruder. The elongational behavior of the blends and their constituents were measured at 150° C. using a RME rheometer. For the elongational viscosity behavior, no significant differences were observed for the strain hardening of the blends containing 10-30% LDPE. Thermal analysis indicated that at concentrations of up to 20% LDPE, there is no significant effect on the melting and crystallization temperatures of LLDPE. The crystallinity and rheology results indicate that 10-20% LDPE is sufficient to provide improved strain hardening in LLDPE.

In "The Effect of Molecular Structure on the Extensional Melt Rheology of Conventional and Metallocene Polyethylenes", *Annual Technical Conference—Society of Plastics Engineers*, (2000), 58th (Vol. 1), 1096-1100, extensional melt rheology and processing characteristics of conventional high pressure low density polyethylene (LDPE) and Ziegler-Natta linear low density polyethylene (LLDPE) are compared with both narrow and broad molecular weight distribution (MWD) and long-chain-branched (LCB) metallocene polyethylenes. The effects of MWD and LCB on the melt behavior of these different types of polymers are presented in terms of their dynamic linear viscosities and their strain-hardening behavior from transient tensile stress growth experiments. Film processability properties are also discussed.

In "Rheological Properties and Molecular Structure of Polymer Melts", *Soft Matter*, (2011), 7(6), 2273-2283, an overview is given on relations between some features of the molecular structure of polymers and their viscous and elastic properties in the molten state. Moreover, it is discussed how the elongational behavior of polymer melts can be affected by molecular parameters. Besides the effects of molar mass and molar mass distribution, more recent results on the influence of long-chain branching on rheological properties are presented. While relationships between rheology and processing are addressed only briefly, the application of the rheological investigations with respect to a molecular characterization and to the detection of small amounts of long-chain branches, in particular, is discussed. Although obtained on materials of a rather simple molecular structure, it is said that the results described in this short review have the potential to be used for other polymeric materials in the field of soft matter, too.

In "Linear Viscoelastic Model for Elongational Viscosity by Control Theory", *Rheologica Acta*, DOI: 10.1007/s00397-011-0598-2, flows involving different types of chain branches were modeled as functions of the uniaxial elongation using generated constitutive model and molecular dynamics for linear viscoelasticity of polymers. Previously, control theory was applied to model the relationship between the relaxation modulus, dynamic and shear viscosity, transient flow effects, power law and Cox-Merz rule related to the MWD by melt calibration. Temperature dependencies and dimensions of statistical chain tubes were also modeled. The procedure presented is said to be very effective at characterizing long-chain branches, and also in providing information on their structure and distribution. Accurate simulations of the elongational viscosities of low-density polyethylene, linear low-density polyethylene and polypropylene, and new types of MWDs were presented. Models were also presented for strain-hardening that included the monotonic increase and overshoot effects.

In "Rheology of Metallocene-Catalyzed Polyethylenes—The Effects of Branching", *Annual Technical Conference—Society of Plastics Engineers*, (1999), 57$^{th}$ (Vol. 1), 1200-1204, the shear and extensional rheology of three polyethylenes (PE's) synthesized using metallocene catalysts are compared. One of the PE's is linear, i.e., no long-chain branches (LCB), while the other two have different amounts of long chain branching. The shear viscosity of the linear PE is reflective of the narrow molecular weight distribution of metallocene catalyzed PE's, while the apparently branched PE's exhibit a higher viscosity and an earlier onset of shear thinning. The linear polymer exhibited lower activation energy than the branched PE with similar MW. The linear PE does not show stress-strain hysteresis while the branched polymer does.

In "Shear and Extensional Rheology of Sparsely Branched Metallocene-Catalyzed Polyethylenes", *Journal of Rheology* (New York), (2000), 44(5), 1151-1167, a study was undertaken to identify any rheological effects that are consistent with the presence of sparse levels of long chain branching (LCB) in metallocene-catalyzed polyethylenes (MCPE) all of the same melt flow index of 1.0. Two Dow INSITE MCPEs with apparently varying levels of LCB (of approximately 0.17 and 0.57/10 000 carbon atoms and one Exxon EXXPOL MCPE with no LCB) were studied. The breadth of distribution as determined by Mw/Mn of the three samples was 2.11 for the Exxon and one of the Dow samples, and 2.42 for the other Dow sample that had the highest degree of LCB. The MCPE with the highest branching seemed to have a slightly higher molecular weight tail in the distribution. The differences in Mw could not account for the appreciably higher zero-shear viscosities of the branched samples relative to the linear sample. Despite the differences in Mw and LCB content in the two Dow samples, they exhibited almost identical shear flow curves at temperatures between 120-170° C. Under constant extension rate deformation, the two samples with LCB showed a significant degree of strain hardening relative to the linear sample. Comparison between the two Dow samples revealed that the sample with the higher degree of LCB showed a greater degree of strain-hardening behavior.

In "Quantitative Analysis of Melt Elongational Behavior of LLDPE/LDPE Blends", *Rheologica Acta*, (2004), 44(2), 198-218, shear and elongational data of blends of linear (LLDPE) and branched (LDPE) polyethylene are reported. Blends show thermo-rheological complex behavior. Also, in unidirectional shear or elongational flow, the linear-viscoelastic deformation regime of the blends is significantly reduced, and the terminal relaxation times of the blends are shifted in the direction of the LDPE homopolymer. Quantitative analysis of elongational viscosity data by use of the Molecular Stress Function (MSF) model reveals that the strain hardening behavior of LLDPE/LDPE blends is completely determined by the LDPE component.

In "Influence of Molar Mass Distribution and Long-Chain Branching on Strain Hardening of Low Density Polyethylene", *Rheologica Acta*, (2009), 48(5), 479-490, low-density polyethylenes (LDPE) were synthesized in a laboratory scale autoclave under high pressure. These samples were found to possess a high molar mass tail, resulting in a distinctly bimodal molar mass distribution and a lower concentration of long-chain branching than typical of commercial LDPEs. Rheological experiments in elongation showed that these samples exhibited a pronounced strain hardening, which could be favorable for distinct processing operations. Although the samples have a rather high molar mass, their zero shear-rate viscosities and shear thinning behavior are still in a range where thermoplastic processing is possible.

In "Shear Modification and Elongational Behavior of Two Types of Low-Density Polyethylene Melts with Different Long Chain Branching", *AIP Conference Proceedings*, (2008), 1027(Pt. 1, 15th International Congress on Rheology, 2008), 454-456, transient biaxial elongational viscosity was measured by the lubricated squeezing flow method in constant volume condition for two kinds of low density polyethylenes (LDPE) with different long chain branches. Significant strain-hardening was observed at low strain rates for both LDPEs. In addition, strain-hardening of both LDPEs was comparable although strain-hardening in uniaxial elongation exhibits great differences. The results are said to be possibly explained by the effect of flow history on elastic properties of LDPEs.

In related patents, "Processing Olefin Copolymers", U.S. Pat. Nos. 6,355,757; 6,391,998 and 6,417,281, each of which are herein incorporated by reference in their entirety, Garcia-Franco et al., there are disclosed branched hydrocarbon copolymers described as having a main, or backbone, chain of ethylene and other insertion copolymerizable monomers, containing randomly distributed side chains of ethylene and other insertion copolymerizable monomers. The backbone chain has a number-average molecular ($M_N$) weight of from 5,000 to 1,000,000 Daltons, preferably from 10,000 to 500,000 Daltons, most preferably from 20,000 to 200,000 Daltons. The side chains have number-average molecular weights of from 2,500 to 125,000 Daltons, preferably from 3,000 to 80,000 Daltons, most preferably from 4,000 to 60,000 Daltons While long-chain-branching (LCB) technology is well-known as the method of choice to improve the processability of polymers and has been part of the polyethylene (PE) industry since its inception in the 1930's, the resulting improved processability is nearly always accompanied by a loss in the mechanical performance of the material. An effective, inexpensive additive that would have a significant impact on the processing/performance balance for such polymers should be useful in a large fraction of the multi-billion dollar market for polyethylene films and molded articles. There could even be a larger impact on polypropylene, where there is very little commercially viable technology for incorporating LCB. This would also be useful in the EPDM elastomer market.

It is an object of the present disclosure to provide additives for substantially linear poly(alpha-olefins), such as polyethylene and polypropylene, and other polymers, such as EPDM elastomers, which provides a positive impact on the processing of such polymers and the overall performance balance for such polymers.

It is also an object of the present disclosure to provide compositions comprising substantially linear poly(alpha-olefins), such as polyethylene and polypropylene, and other polymers, such as EPDM elastomers, and an amount of an additive, which compositions have improved processing and improved overall performance balance for such compositions.

It is also a further object of the present disclosure to provide methods for improving processing of compositions comprising substantially linear poly(alpha-olefins), such as polyethylene and polypropylene, and other polymers, such as EPDM elastomers, as well as improving the overall performance balance for such compositions.

These and other objectives are accomplished and will be understood by reference to the following drawings and detailed description.

SUMMARY

In one embodiment, there is provided an additive for blending with one or more substantially linear poly(alpha-olefins), such as polyethylene and polypropylene, and other polymers, such as EPDM elastomers, which additive is comprised of one or more comb polymers having a backbone with polymeric arms attached thereto, which comb polymer imparts to the resulting blend improved processing of compositions comprising substantially linear poly(alpha-olefins), such polyethylene and polypropylene, and other polymers, such as EPDM elastomers, as well as improving the overall performance balance for such compositions as compared to the substantially linear poly(alpha-olefins), such polyethylene and polypropylenes, or other polymers, such as EPDM elastomers, alone.

In a further embodiment, there is provided a polymer blend composition comprising a blend of one or more substantially linear poly(alpha-olefins), such as polyethylene and polypropylenes, and other polymers, such as EPDM elastomers and an effective amount of one or more comb polymers having a backbone with polymeric arms attached thereto, which compositions have improved processing, as well as improved overall performance balance for such compositions as compared to the same one or more substantially linear poly(alpha-olefins), such as polyethylene and polypropylenes, and other polymers, such as EPDM elastomers alone.

In a still further embodiment, there is provided process for preparing a polymer blend composition comprising a blend of one or more substantially linear poly(alpha-olefins), such as polyethylene and polypropylene, and other polymers, such as EPDM elastomers having improved processing, as well as improved overall performance balance as compared to the same alone, said process comprising:

a. providing one or more of said substantially linear polymer(s); and b. blending with the one or more substantially linear polymer(s) an effective amount of one or more comb polymers having a backbone with polymeric arms attached thereto.

In an additional further embodiment, there is provided a method for improving one or more of the physical properties of one or more substantially linear poly(alpha-olefins), such as polyethylene and polypropylene, and other polymers, such as EPDM elastomers, said properties including the processing of such polymers and the overall performance balance for such polymers, said process comprising adding to the one or more polymer(s) an effective amount of one or more comb polymers having a backbone with polymeric arms attached thereto.

DETAILED DESCRIPTION

All numerical values in this disclosure are understood as being modified by "about" or "approximately" the indicated value, and take into account experimental error and variations that would be expected by a person having ordinary skill in the art. The original forms of polyethylene, from the high pressure free radical polymerizations that produce high-pressure low density polyethylene (HP-LDPE), contain a broad mix of long chain branches (LCBs) and offer great processability. Thus, HP-LDPE requires less energy input in extrusion and film blowing processes than metallocene gas-phase linear low density polyethylene (mLLDPE, such as Exceed™ or Enable™ from ExxonMobil, or Engage™ from Dow Chemical). However, LLDPE has superior performance to HP-LDPE in properties such as tear strength and dart impact. Although the presence of long chain branching (LCB) in HP-LDPE can provide the LDPE processability, some or all of those long chain branched molecules may affect the crystallization process and the resulting crystalline morphology leading to the erosion in film strengths. However, there are no methods presently available to fractionate LDPE based on LCB branch types to understand the LCB branch structural effects on processability and on film properties. With the excellent film strengths that can be obtained from mLLDPE, many converters now use blends of HP-LDPE and LLDPE on their film lines in order to have better processability. The addition of LDPE into mLLDPE can reduce the extrusion torque and can raise the maximum blown film line speed, but it also lowers the film strengths from the resulting blends. Hence, it is a common practice to add a minimal amount of LDPE, ~10%, sufficiently to raise the film line speed but without lowering the film strength by more than ½. This allows them to achieve a better balance of properties.

Metallocene catalysts have been developed that produce some LCB by re-incorporating some chains into other growing backbones. While these products can be useful, such a random process also does not achieve the preferred distribution of LCB, which ultimately dictates the material flow behavior. By controlling these LCB parameters, a polymer that has superior processing and mechanical performance could theoretically be made. The development of the next generation of polyethylene film grades requires a continuing effort to balance the resin processability with the product mechanical properties, such as the film toughness and clarity.

In previous work, it was shown that a precise control of LCB type (star, comb, or pompom molecules) could significantly improve both the shear and elongational rheological properties of polymers (see, U.S. Pat. Nos. 6,391,998 and 6,417,281, as well as *Macromolecules,* 2002, 35, 3066, all of which are herein incorporated by reference). In accordance with the present disclosure, it has been discovered how to relate the topological details of the comb molecules (e.g., the length of the dangling arms, their number or spacing on the comb backbone, their concentration) to the extensional rheology without impacting the shear rheology, once they have been added in very small amounts (≤5 wt. %, preferably ≤2 wt. % and more preferably ≥0.5 wt. % to ≤1.5 wt. %) to a metallocene-catalyzed linear matrix, in the work described in the experimental section which follows, namely Exceed 1018. By modifying the geometrical details of the comb structure, it was discovered that it was possible to adjust the strain hardening response (SHR) of the blend, without any effect on the shear rheology compared to the neat linear matrix. The SHR is a determining factor in processes such as film blowing, melt spinning, blow molding, foaming and thermoforming, where the extensional deformation is dominant. This is particularly critical to film blowing, where processability depends both on the ease of extrusion of the molten resin as well as the rate at which film can be produced as the bubble is blown up. The former aspect depends on the shear rheology (substantially unchanged in this disclosure), the latter on its extensional behavior (greatly improved by the addition of precisely branched comb additives). This work was motivated by the desire to make optimum branched comb molecules at a cost that could potentially allow them to be used as additives for PE film resins that could be added after polymerization, such as in a pelletization finishing extruder. Again, the geometrical details of the comb molecules are key to the processing of film: the same zero-shear-rate viscosity as the neat matrix ensures that the energy required for extrusion of the blend will be the same as that of the original matrix, and an enhanced extensional thickening means that the bubble formed in film blowing will be much more stable, allowing higher rates of production or blown film line speeds.

Polymers containing long branches (i.e., long enough to be entangled, that is, being longer than the molecular weight between entanglements, for instance 1000 kg/mol for polyethylene) have qualitatively different flow behavior than those which are purely linear, and this greatly influences the processability of these materials. As such it is often highly desirable to incorporate the optimal amount and type of long-chain-branching (LCB) into polymeric materials to achieve the most useful set of rheological properties in both shear and extensional flows. Despite the importance of LCB, there exists to date no current characterization tool capable of quantitatively analyzing the branching type and amount for an unknown polymer sample. Thus, this makes the ability to identify the optimal LCB structure and amount responsible for the improved processability a very challenging task. The present disclosure describes how the addition of an effective amount of well-defined comb polymers to a matrix of substantially linear polymers (Exceed 1018 in the particular examples which follow) leads to blends that have superior extensional rheology (strain hardening ratio (SHR) greater than 1 with little impact on the shear properties (increase in zero-shear-rate viscosity generally less than or equal to 5%), which remain close to that of the original linear matrix. For purposes of the present disclosure, a substantially linear polymer includes, but is not limited to, linear polyolefins, poly (alpha-olefins), polyethylene, polypropylene, poly butene-1, EPDM elastomers, and combinations thereof. With regard to an "effective amount" of comb polymers added to the polymer blends of the present disclosure, it is defined generally as a small amount, and more particularly as less than 4 wt %, or less than 3 wt %, or less than 2 wt %, or less than 1.8 wt %, or less than 1.6 wt %, or less than 1.4 wt %, or less than 1.2 wt %, or less than 1.0 wt %, or less than 0.8 wt %, or less than 0.6 wt. %, or less than 0.4 wt. % of the blend. Alternatively, the strain hardening ratio of the polymer blends disclosed herein may be greater than 1.5, or greater than 2.0, or greater 2.5, or greater 2.7, or greater 3.0, or greater 3.5, or greater 4.0, or greater 4.5, or greater 5.0, or greater 5.5, or greater 6.0, or greater 6.5, or greater 7.0, or greater 7.5, or greater than 8.0. Alternatively, the increase in zero-shear-rate viscosity of the polymer blends disclosed herein may be less than or equal to 4.5%, or less than or equal to 4.0%, or less than or equal to 3.5%, or less than or equal to 3.0%, or less than or equal to 2.5%, or less than or equal to 2.0%, or less than or equal to 1.5%, or less than or equal to 0.5%.

In particular, the present inventors for the first time have connected the amount and topological features of the branched additive to the ultimate blend flow behavior. These amounts include the number of dangling arms, their molecular weight, and their spacing along the comb backbone (or branching density). Most specifically, the dense comb polyethylenes are semi-crystalline with their crystallinity preferably greater than 10%, more preferably greater than 15%, and most preferably greater than 20%. They are preferred to have 8 arms and more, more preferably 10 arms and more, and most preferably 12 arms and more. Each arm has a $M_N$ preferably to be greater than 5,000, more preferably greater than 7,500, and most preferably greater than 10,000. In any event, the $M_N$ of the branches has to be greater than 1000 kg/mol. The MW of the backbone to which all arms are attached is preferred to be 50,000 or higher, more preferably 75,000 or higher, and most preferably 100,000 or higher.

The disclosure will now be described with reference to the following examples. These examples are for the purpose of more fully explaining to one of skill in the art the practice of the present disclosure. These examples are not limiting to the full scope of the present disclosure as explained above and as encompassed in the claims which follow.

EXAMPLES

All samples in Table 1 which follows were comprised of Exceed™ 1018 (ExxonMobil Chemical) as the base linear PE polymer (reference) having 1 wt. % (if not otherwise specified) of the specified additive blended therein. The blending was performed using a DSM twin-screw miniature extrusion mixer running at 185° C., 50 RPM, and the blends were mixed and blended for 3 minutes. 0.1% of BHT stabilizer was added in each batch. All blend samples were thereafter compression molded into pads at 190° C. for subsequent rheological testing. The specific characteristics of each of the additives in terms of the number average molecular weight of the backbone, the number average molecular weight of the arms, and the number of arms on each backbone are set forth in Table 1.

TABLE 1

| | Mw(backbone)/Mb [kg/mol] | Mw(arm)/Ma [kg/mol] | No. of arms (q) |
|---|---|---|---|
| EXCEED 1018 | 120 | 0 | 0 |
| COM3 | 105 | 6.7 | 34 |
| COM4 | 105 | 5.7 | 11 |
| COM6 | 101 | 24.4 | 21.9 |
| COM7 | 104 | 5.4 | 2.1 |
| COM8 | 104 | 5.4 | 14.8 |
| COM8 | 104 | 5.4 | 14.8 |
| COM8 | 104 | 5.4 | 14.8 |
| COM10 | 108 | 11.3 | 10.7 |
| COM16 | 104 | 16.8 | 14.3 |
| COM17 | 104 | 22.4 | 14 |
| COM17 | 104 | 22.4 | 14 |
| COM17 | 104 | 22.4 | 14 |
| COM18 | 56.5 | 22 | 15 |
| COM19 | 56.5 | 22 | 6.1 |
| COM22 | 96 | 12 | 15.6 |
| COM20(f2) | 96 | 5 | 16.2 |
| COM21(f2) | 96 | 10 | 16.5 |

All comb additives in Table 1, except COM18 and COM19 have a backbone length approximately equivalent to the number average molecular weight of the linear matrix, namely Exceed 1018.

Dynamic shear melt rheological data were measured with an Advanced Rheometrics Expansion System (ARES) using parallel plates (diameter=25 mm.) in a dynamic mode under nitrogen atmosphere. For all experiments, the rheometer was thermally stable at 190° C. for at least 30 minutes before inserting the compression-molded sample of resin onto the parallel plates. To determine the viscoelastic behavior of the samples, frequency sweeps in the range from 0.01 to 100 rad/s were carried out at 190° C. under constant strain. Depending on the molecular weight and temperature, strains of 10% or less were used and linearity of the response was verified. A nitrogen stream was circulated through the sample oven to minimize sample degradation during the experiments.

The transient uniaxial extensional viscosity was measured at a strain rate of $1\ s^{-1}$ using a SER-2-A Testing Platform available from Xpansion Instruments LLC, Tallmadge, Ohio, USA. The SER Testing Platform was used on a Rheometrics ARES strain-controlled rotational rheometer available from TA Instruments Inc., New Castle, Del., USA. The SER Testing Platform is described in U.S. Pat. Nos. 6,578,413 and 6,691,569, which are herein incorporated by reference in their entirety. A general description of transient uniaxial extensional viscosity measurements is provided, for example, in "Strain Hardening of Various Polyolefins in Uniaxial Elongational Flow", *J. Rheol.*, 47(3), 619-630 (2003) and "Measuring the Transient Extensional Rheology of Polyethylene Melts Using the SER Universal Testing Platform", *J. Rheol.*, 49(3), 585-606 (2005). Strain hardening occurs when a polymer is subjected to uniaxial extension and the transient extensional viscosity increases more than what is predicted from linear viscoelasticity theory. Strain hardening is observed as an abrupt upswing of the extensional viscosity in the transient extensional viscosity versus time plot. A strain hardening ratio (SHR) is used to characterize the upswing in extensional viscosity and is generally defined as the ratio of the maximum transient extensional viscosity over three times the value of the transient zero-shear-rate viscosity at the same strain (or linear viscoelastic envelope (LVE)).

Alternatively, when the peak in the extensional viscosity cannot be captured during the experiment (as was the case in U.S. Pat. Nos. 6,355,757, 6,391,998, and 6,417,281), one can define the SHR as the ratio of the transient extensional viscosity over three times the value of the transient zero-shear-rate viscosity at a strain of three. In both cases, strain hardening is present in the material when the ratio is greater than 1.

Figure 1:
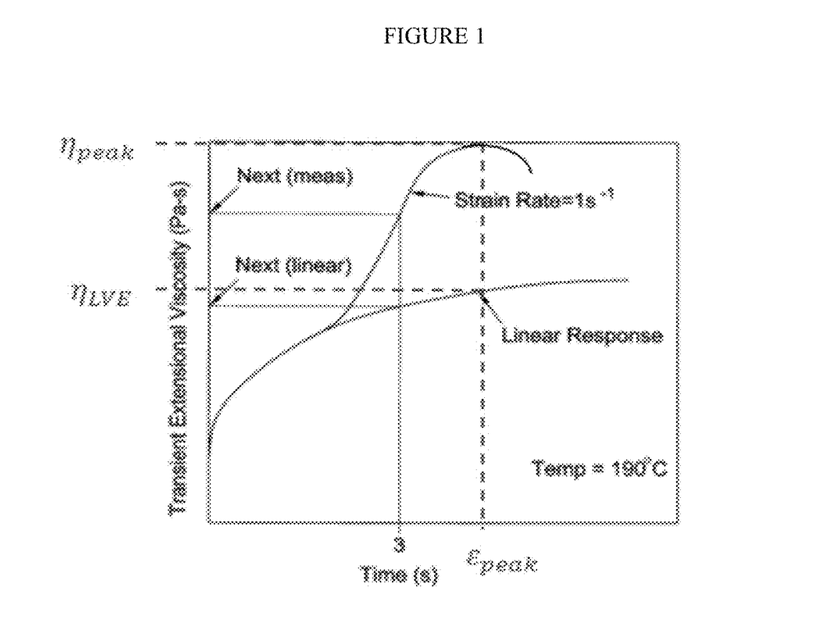
FIG. 1 shows graphically the definition of Strain Hardening Ratio (SHR) plotted according to Equation 1.

As shown in FIG. 1, according to the present disclosure, the SHR in this work is defined as:

$$SHR = \eta_{peak}(\varepsilon_{peak})/\eta_{LVE}(\varepsilon_{peak}) \geq 1. \qquad \text{Eq. (1)}$$

TABLE 2

Shear and Extensional Properties of the Blends

| Sample | Mb [kg/mol] | Ma [kg/mol] | Atm # [—] | Concentration [wt. %] | $\eta_0$ [Pas] | Change in viscosity [%] | SHR [—] |
|---|---|---|---|---|---|---|---|
| Exceed 1018 (Matrix) | n/a | n/a | n/a | n/a | 8010 | n/a | 1 |
| COM3 | 105 | 6.7 | 34 | 2 | 8648 | 8 | 5.6 |

TABLE 2-continued

Shear and Extensional Properties of the Blends

| Sample | Mb [kg/mol] | Ma [kg/mol] | Atm # [—] | Concentration [wt. %] | $\eta_0$ [Pas] | Change in viscosity [%] | SHR [—] |
|---|---|---|---|---|---|---|---|
| COM4 | 105 | 5.7 | 11 | 1 | 8147 | 1.7 | 2 |
| COM6 | 101 | 24.4 | 21.9 | 1 | 8309 | 3.7 | 2.6 |
| COM7 | 104 | 5.4 | 2.1 | 1 | 7434 | (7.2) | 1 |
| COM8 | 104 | 5.4 | 14.8 | 1 | 8239 | 2.9 | 1 |
| COM8 | 104 | 5.4 | 14.8 | 3 | 9827 | 22.7 | 1.9 |
| COM8 | 104 | 5.4 | 14.8 | 5 | 13070 | 63.2 | 2.2 |
| COM10 | 108 | 11.3 | 10.7 | 1 | 8304 | 3.7 | 1 |
| COM16 | 104 | 16.8 | 14.3 | 1 | 8192 | 2.3 | 3.7 |
| COM17 | 104 | 22.4 | 14 | 1 | 8367 | 4.5 | 7.9 |
| COM17 | 104 | 22.4 | 14 | 0.5 | 7917 | (1.2) | 3.2 |
| COM17 | 104 | 22.4 | 14 | 0.25 | 7678 | (4.1) | 2.5 |
| COM18 | 56.5 | 22 | 15 | 1 | 7667 | (4.3) | 1.8 |
| COM19 | 56.5 | 22 | 6.1 | 1 | 7803 | (2.6) | 2.9 |
| COM22 | 96 | 12 | 15.6 | 1 | 8140 | 1.6 | 2.6 |
| COM20(f2) | 96 | 5 | 16.2 | 1 | 8141 | 1.6 | 1.2 |
| COM21(f2) | 96 | 10 | 16.5 | 1 | 8215 | 2.6 | 2.9 |

In Table 2, the zero-shear-rate viscosity is defined at 0.03 s$^{-1}$. For all blends showing strain-hardening, the addition of small amounts of combs (less or equal to 1 wt. %) does not lead to an increase in the zero-shear-rate viscosity of the sample greater than 5%.

Figure 2:
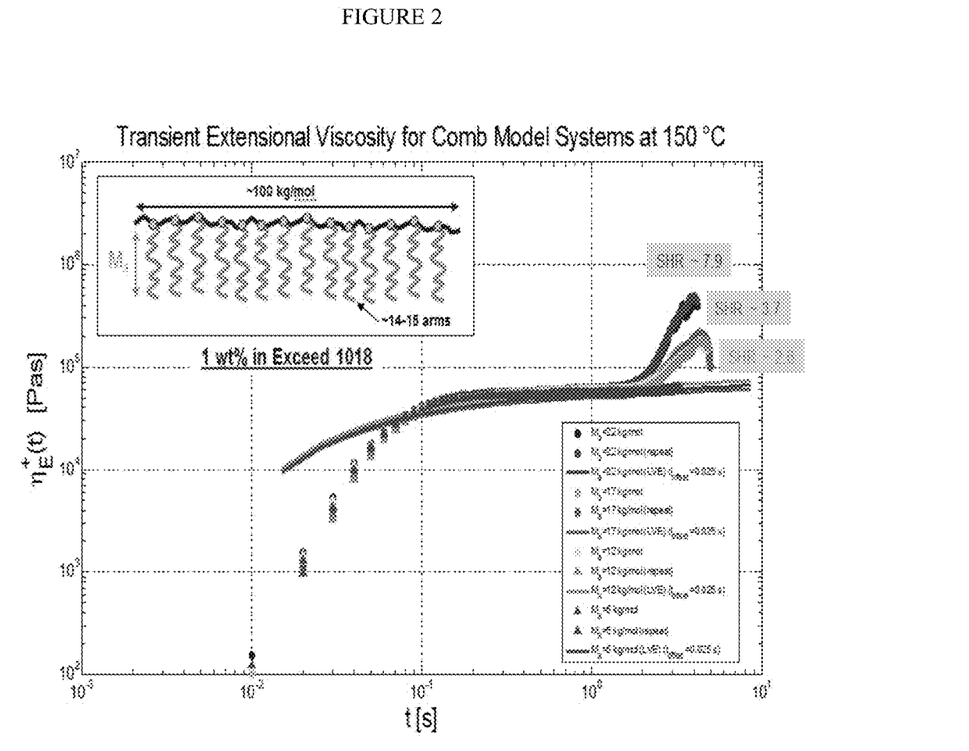
FIG. 2 shows the Effect of Comb Arm Length on SHR.

In FIG. 2, the spacing between the arms attached to the comb backbone shown in the insert is not representative of the actual comb structure. In reality, the arms are randomly distributed along the comb backbone due to the nature of the comb synthesis. Thus, the spacing between the arms along the polymer backbone is described in terms of "average" spacing wherein the number of arms is divided into the molecular weight of the polymer backbone. By way of illustrative example, a backbone of molecular weight 100,000, which has 10 combs attached, would be said to have an arm spacing of molecular weight 10,000. FIG. 2 shows that when the arm molecular weight is above 5 kg/mol, the blend shows strain hardening, all other things being equal. At 1 wt. %, the observed strain hardening is not accompanied by an increase in the zero-shear rate viscosity (see, Table 2). Also, even though it is not represented here for the sake of clarity, the data for the neat matrix (Exceed 1018) is similar to that of the comb with Ma=5 kg/mol.

Figure 3:
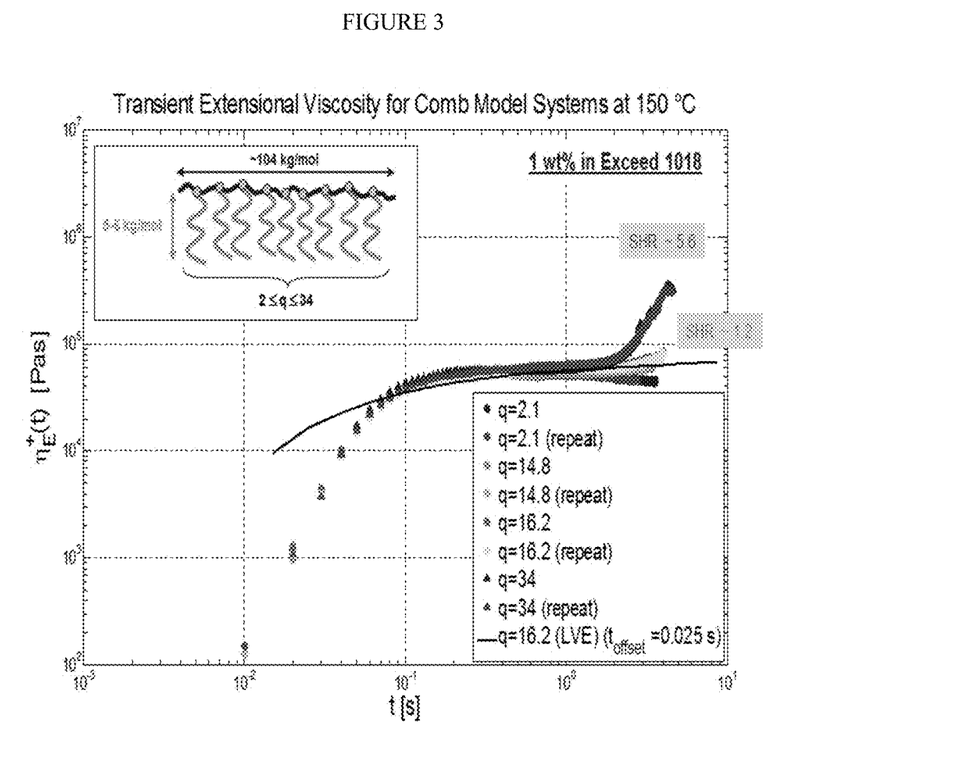
FIG. 3 shows the Effect of Comb Arm Number on SHR.

In FIG. 3, the number of arms q is gradually increased for a fixed backbone and arm length, namely 104 and 5 kg/mol, respectively. It is shown that when the arms attached to the comb backbone are short (~5 kg/mol), the strain hardening can be created by increasing their number (or BD, branch density). The onset of strain hardening (SHR>1) occurs when the arm number is equal to or greater than 15. Although it is not a 1 wt. % blend, the blend containing the 34-arm comb (at 2 wt. %) clearly shows the increase in the SHR with increasing the number of arms. However, for this particular blend (which is the same as "Example 5" or "Blend 1" in U.S. Pat. Nos. 6,355,757; 6,391,998; and 6,417,281), the change in shear properties is greater than 5% (see, COM3 in Table 2).

Figure 4:
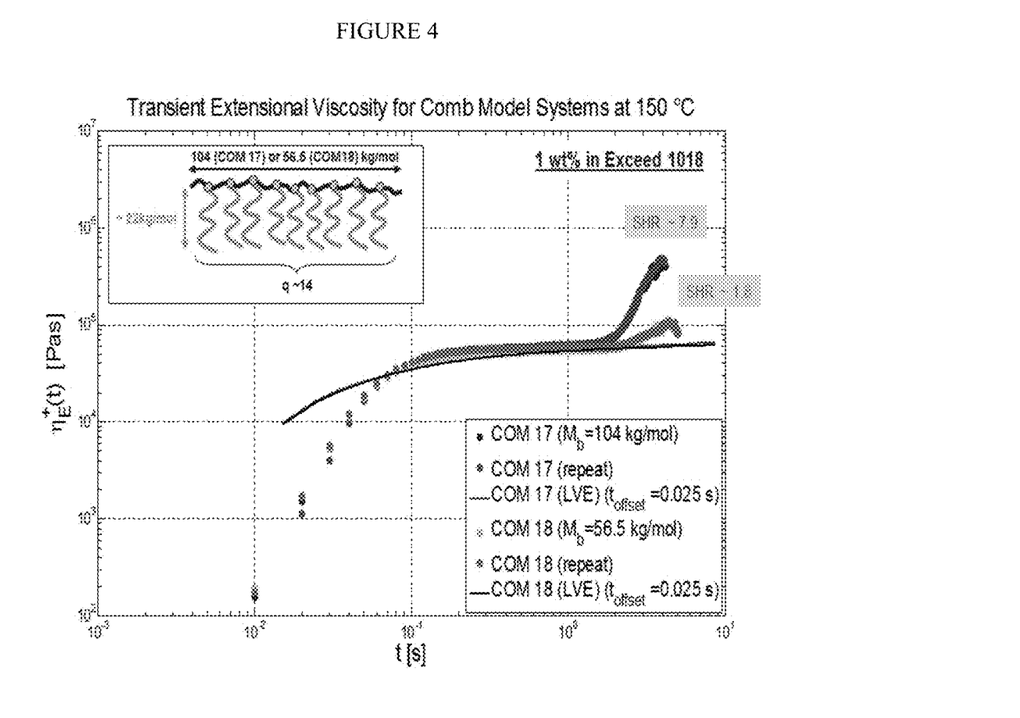
FIG. 4 shows the Effect of Comb Arm Spacing on SHR.
Figure 5:
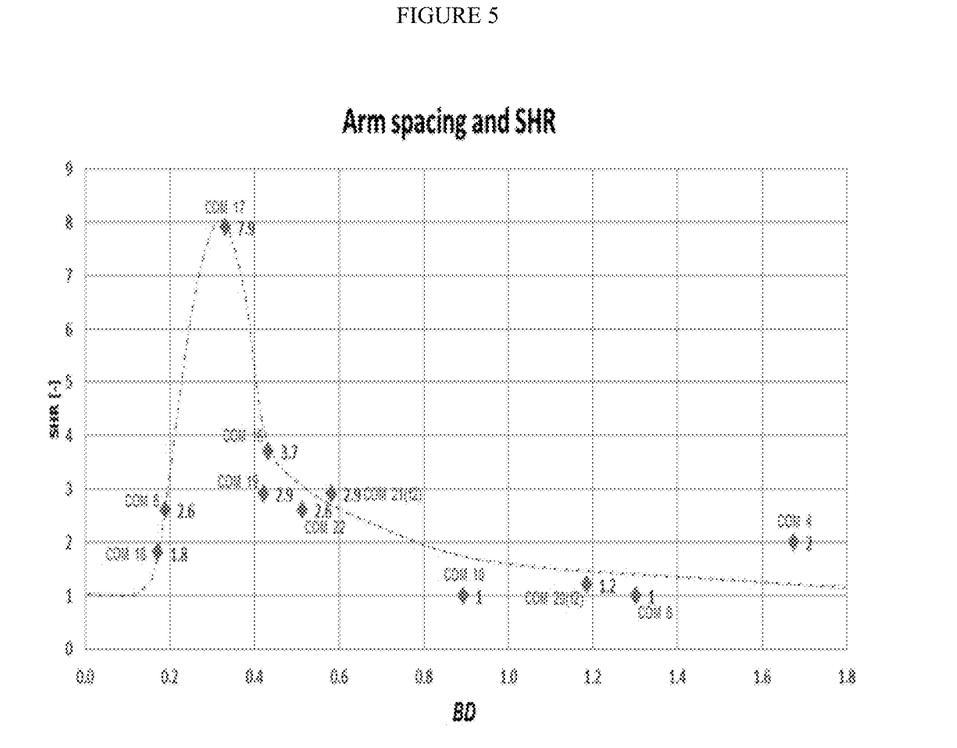
FIG. 5 shows the relationship between SHR and Branching Density ("BD" as defined in Equation 2).

In FIG. 4, it is shown that a decrease in the average spacing between two consecutive dangling arms of the same length can lead to a diminution in the strain hardening response. This is further illustrated in FIG. 5, where a plot of the SHR as a function of the branching density (BD) for different combs, which is expressed as a fraction of the total comb arm length by:

$$BD = (M_b/q)/M_a \qquad \text{(Eq. 2)}$$

where Mb, q and Ma represent, respectively, the backbone molecular weight, the number of arms, and the arm molecular weight is set forth. In FIG. 5, it is shown that there exists an optimum spacing between the comb arms. The maximum SHR is reached when the spacing is a third of the total arm length. The strain hardening response is diminished, however, when the spacing is greater than one arm length, or substantially less than 20% of it. Again, no increase in the shear properties greater than 5% is observed for these blends, as summarized in Table 2.

Figure 6:
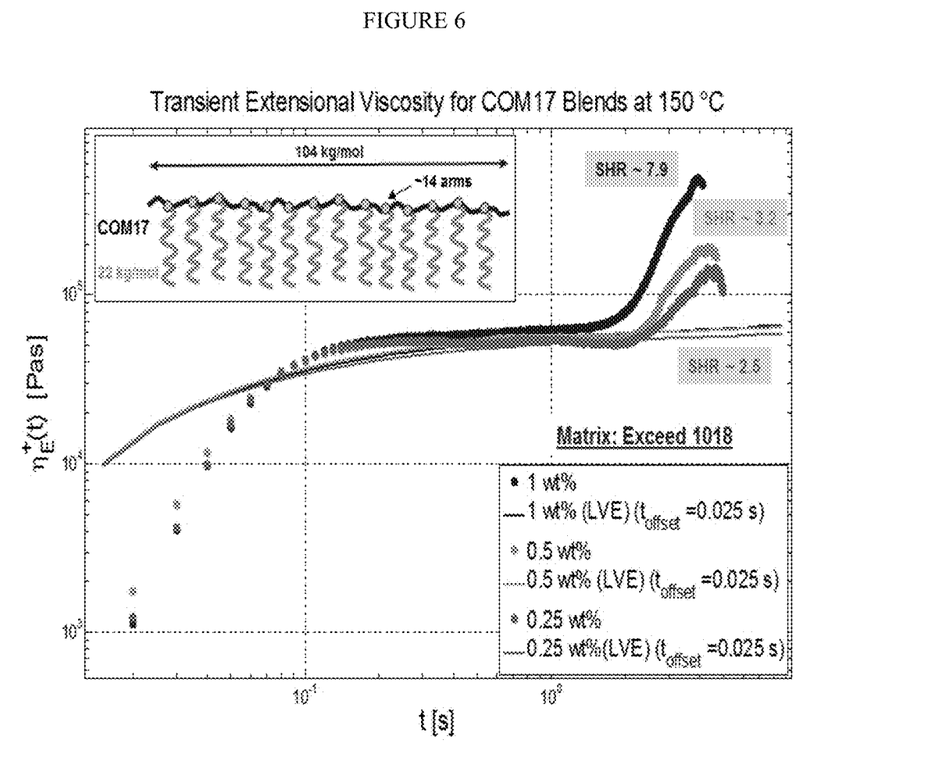
FIG. 6 shows the Effect of Comb Concentration on SHR.

In FIG. 6, there is shown the effect of the comb concentration on the SHR for the most effective comb structure studied in the present disclosure to date (COM17 in Table 2).

Figure 7:
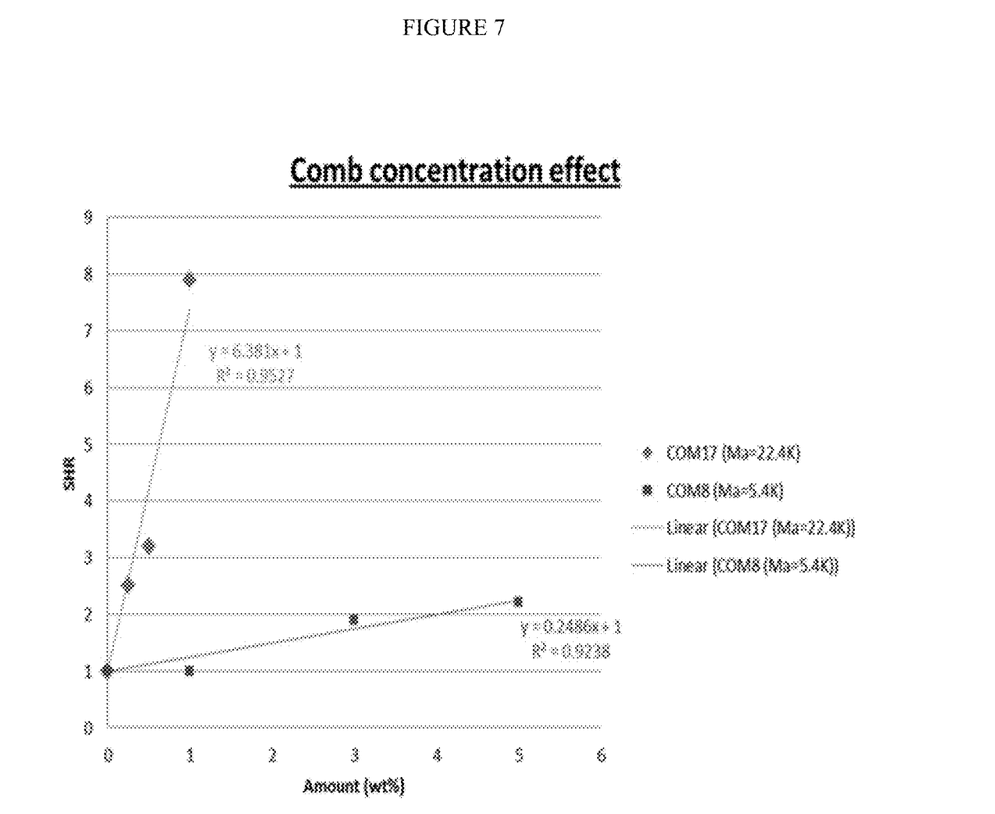
FIG. 7 shows the Linear Dependence of SHR with Comb Concentration.

As can be seen in FIG. 7, there exists a linear relationship between the SHR and the comb concentration in the blend. Also, the slope of the linear fit increases with increasing arm length.

PCT and EP Clauses

1. A polymer blend composition comprising a blend of one or more substantially linear polymers and an effective amount of one or more comb polymers having a backbone with polymeric arms attached thereto, which comb polymer imparts to the blend an extensional rheology, as measured by SHR, of greater than 1 as compared to the same one or more linear polymers alone, and an increase in zero-shear-rate viscosity of less than or equal to 5% as compared to the same one or more linear polymers alone.

2. The composition of clause 1 wherein the one or more comb polymers is semi-crystalline and has a crystallinity content of from greater than 10% to greater than 20%.

3. The composition of clauses 1-2 wherein the one or more comb polymers have more than 8 arm.

4. The composition of clauses 1-3 wherein each arm of the one or more comb polymers has a number average molecular weight of greater than 5,000.

5. The composition of clauses 1-4 wherein the backbone of the one or more comb polymers has a number average molecular weight of greater than 50,000.

6. A polymer additive for blending with one or more substantially linear polymers, which additive is comprised of one or more comb polymers having a backbone with polymeric arms attached thereto, which comb polymer imparts to the resulting blend an extensional rheology, as measured by SHR, of greater than 1 as compared to the same one or more linear polymers alone, and an increase in zero-shear-rate viscosity of less than or equal to 5% as compared to the same one or more linear polymers alone.

7. A process for preparing a polymer blend composition comprising a blend of one or more substantially linear polymers having improved processing, as well as improved overall performance balance as compared to the same one or more substantially linear polymers alone, said process comprising:
  a. providing one or more of said polymer(s); and
  b. blending with the one or more polymer(s) an effective amount of one or more comb polymers having a backbone with polymeric arms attached thereto, wherein the resulting blend has an extensional rheology, as measured by SHR, of greater than 1 as compared to the same one or more linear polymers alone, and an increase in zero-shear-rate viscosity of less than or equal to 5% as compared to the same one or more linear polymers alone.

8. A method for improving one or more of the physical properties of one or more substantially linear polymers, such as EDM elastomers, said properties including the processing characteristics of such polymers and the overall performance balance for such polymers, said process comprising adding to the one or more polymer(s) an effective amount of one or more comb polymers having a backbone with polymeric arms attached thereto, wherein the resulting blend has an extensional rheology, as measured by SHR, of greater than 1 as compared to the same one or more linear polymers alone, and an increase in zero-shear-rate viscosity of less than or equal to 5% as compared to the same one or more linear polymers alone.

9. The composition of clauses 1-5, wherein an effective amount of the one or more comb polymers is less than 2 wt. % of the blend.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above but, rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

All of the patents and publications mentioned herein are incorporated by reference into this application, as if fully set forth herein, for all that such patents and publications contain in their written disclosures. When numerical lower limits and numerical upper limits are listed herein, ranges from any lower limit to any upper limit are contemplated.

What is claimed is:

1. A polymer blend composition comprising a blend of one or more substantially linear polymers and an effective amount of one or more comb polymers having a backbone with polymeric arms attached thereto, which comb polymer imparts to the blend an extensional rheology, as measured by strain hardening ratio (SHR), of greater than 1, and an increase in zero-shear-rate viscosity of less than or equal to 5% as compared to the same one or more substantially linear polymers alone; wherein an effective amount of the one or more comb polymers is less than 2 wt. % of the polymer blend composition; and wherein the one or more comb polymers have a branching density (BD) from about 0.1 to about 0.8.

2. The composition of claim 1, wherein an effective amount of the one or more comb polymers is less than 1 wt. % of the blend.

3. A composition according to claim 1 wherein the one or more comb polymers is semi-crystalline and has a crystallinity content of greater than 10%.

4. A composition according to claim 1 wherein the one or more comb polymers is semi-crystalline and has a crystallinity content of greater than 15%.

5. A composition according to claim 1 wherein the one or more comb polymers is semi-crystalline and has a crystallinity content of greater than 20%.

6. A composition according to claim 1 wherein the one or more comb polymers have more than 8 arms.

7. A composition according to claim 1 wherein the one or more comb polymers have more than 10 arms.

8. A composition according to claim 1 wherein the one or more comb polymers have more than 12 arms.

9. A composition according to claim 1 wherein each arm of the one or more comb polymers has a number average molecular weight of greater than 5,000.

10. A composition according to claim 1 wherein each arm of the one or more comb polymers has a number average molecular weight of greater than 7,500.

11. A composition according to claim 1 wherein each arm of the one or more comb polymers has a number average molecular weight of greater than 10,000.

12. A composition according to claim 1 wherein the backbone of the one or more comb polymers has a number average molecular weight of greater than 50,000.

13. A composition according to claim 1 wherein the backbone of the one or more comb polymers has a number average molecular weight of greater than 75,000.

14. A composition according to claim 1 wherein the backbone of the one or more comb polymers has a number average molecular weight of greater than 100,000.

15. A process for preparing a polymer blend composition comprising a blend of one or more substantially linear polymers having improved processing, as well as improved overall performance balance as compared to the same one or more substantially linear polymers alone, said process comprising:
  a. providing one or more of said substantially linear polymer(s); and
  b. blending with the one or more substantially linear polymer(s) an effective amount of one or more comb polymers having a backbone with polymeric arms attached thereto, wherein the resulting blend has an extensional rheology, as measured by strain hardening ratio (SHR), of greater than 1, and an increase in zero-shear-rate viscosity of less than or equal to 5% as compared to the same one or more substantially linear polymers alone; wherein an effective amount of the one or more comb polymers is less than 2 wt. % of the polymer blend composition; and wherein the one or more comb polymers have a branching density (BD) from about 0.1 to about 0.8.

16. A method for improving one or more of the physical properties of one or more substantially linear polymers, said properties including the processing characteristics of such polymers and the overall performance balance for such polymers, said process comprising adding to the one or more substantially linear polymers polymer(s) an effective amount of one or more comb polymers having a backbone with polymeric arms attached thereto such that the resulting blend has an extensional rheology, as measured by strain hardening ratio (SHR), of greater than 1, and an increase in zero-shear-rate viscosity of less than or equal to 5% as compared to the same one or more substantially linear polymers alone; wherein an effective amount of the one or more comb polymers is less than 2 wt. % of the polymer blend composition; and wherein the one or more comb polymers have a branching density (BD) from about 0.1 to about 0.8.

\* \* \* \* \*